Aug. 13, 1946.  A. B. ALLEN  2,405,630
CULTIVATOR WHEEL
Filed April 20, 1944

INVENTOR:
Andrew. B. Allen

Patented Aug. 13, 1946

2,405,630

UNITED STATES PATENT OFFICE 2,405,630

CULTIVATOR WHEEL

Andrew B. Allen, Ochre River, Manitoba, Canada
Application April 20, 1944, Serial No. 531,894

3 Claims. (Cl. 97—217)

My invention relates to cultivator wheels designed to be mounted in line upon a shaft positioned diagonally to the direction of travel, precisely in the manner that conventional cultivator discs are mounted, an object of this invention being to provide a device of the character herewithin described by means of which a more efficient weed exterminating operation may be carried out in one stroke of the implement to which my wheels are attached.

A further object of my invention is to provide a device of the character herewithin described which is simplified, self-cleaning, can be attached readily to the diagonal shaft of any disc cultivator, is of rugged construction, and is provided with a detachable rim capable of being sharpened or replaced.

With the above more important objects in view and such other minor objects as may appear as the specification proceeds, my invention consists essentially in the arrangement and construction of parts all as hereinafter more particularly described, reference being had to the accompanying drawing, in which.

In the drawing like characters of reference indicate corresponding parts in the different figures.

Figure 4:
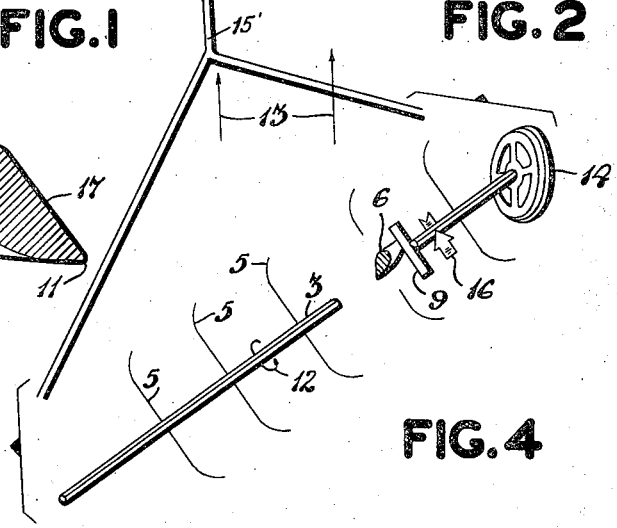
Figure 4 is a schematic plan embodying a skeletal representation of the essential parts of a disc cultivator superstructure, viz. the draw bar, diagonal shaft, and the ground wheel thereof, and illustrating my cultivator wheels in situ thereon.

To describe first one of my cultivator wheels per se, the same will be seen to comprise a concentric hub 1 provided with a squared central aperture 2 designed to engage the conventional squared, horizontal, and diagonally disposed disc shaft 3, a sleeve 4 functioning as a spacer being formed integral with the hub, and being provided for the purpose of spacing the several wheels 5 a desired distance apart as illustrated in the accompanying Figure 4, the sleeve 4 functioning in precisely the same manner as the spacing sleeves which are commonly inserted between each conventional cultivating disc when these are mounted on the shaft 3.

Radiating from the hub 1 are spokes 6, of which any desired number may be provided, although I have found that five is, for most conditions the most satisfactory number.

Figure 1:
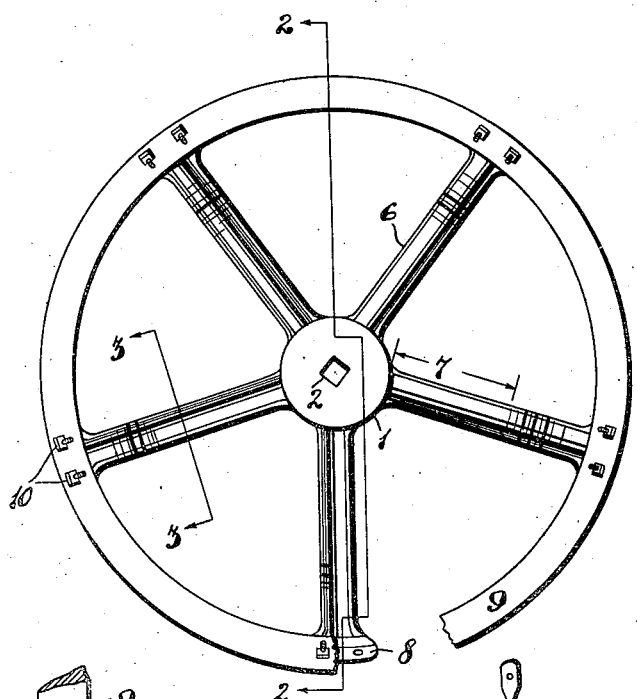
Figure 1 is a view of one of my cultivator wheels in the plane of its rotation.

The spokes 6 are preferably straight between the limits 7 (see Figures 1 and 2), but then proceed to perform a deep curvature, so that the wheel as-a-whole may be properly described as concave.

Figure 2:
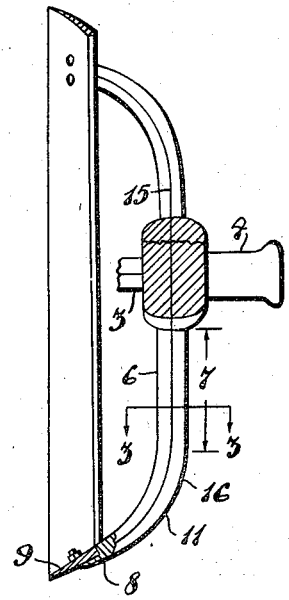
Figure 2 is a section on the line 2—2 of Figure 1.

The outer ends 8 of the spokes are rabbeted to receive the rim 9, which is secured to the spokes by means of the nut and bolt assemblies 10, the rim being edge-sharpened as clearly illustrated in the accompanying Figure 2.

Figure 3:
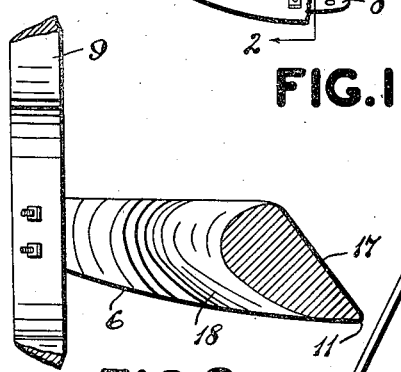
Figure 3 is a section on the line 3—3 of Figure 1.

Although the spokes 6 may be of round transverse cross-section, or of any other desired transverse cross-section, it is to be noted from Figures 3 and 4 that the spokes are shaped to a transverse cross-sectional configuration such as provides a longitudinal edge 11 to facilitate the penetration or entrance of the spokes into the ground while the wheels are rotating askew in the direction of the arrow 12 when the cultivator superstructure is being pulled in the direction of the arrows 13.

It is to be understood that my cultivating wheels rotate just as do conventional cultivating discs when mounted at spaced intervals upon a disc shaft 3 having the conventional ground wheel 14 keyed to the end thereof. However, since I deem it desirable for the purpose of reducing draft that the spokes should penetrate the ground with as little resistance as possible, it is to be understood that the longitudinal edges 11 are so positioned that they will enter the ground first as the wheels roll forward.

Since the cultivator wheels are positioned diagonally, or askew with respect to the direction of travel of cultivator superstructure, it will be apparent that in order to design spokes of a transverse cross-section such as will reduce draft to a minimum, the longitudinal edges 11 thereof must be on the convex side of the neutral plane of the wheel as-a-whole, and such plane I have indicated in the accompanying Figure 2 by the numeral 15. In fact, as a consideration of Figure 2 will indicate, the heavy boundary line 16 of the downwardly extending spokes 6 represents the edge 11 of that spoke.

In the accompanying Figure 4, I have endeavored to indicate the manner in which the edges 11 of the spokes enter the ground first, Figure 4 embodying a schematic representation of the essential parts of a conventional cultivating disc superstructure required for orientating one's mind to the cross-section of my spokes, and in this figure I have included a draw bar assembly 15', whereby the implement including the diagonal shaft 3 is drawn in the direction of the arrows 13.

In Figure 4 I have illustrated several cultivating wheels schematically, but have included in one of them a fragmentary representation of a portion of a wheel rim 9 and a spoke 6, in connection with which it should be understood that the fragment of spoke illustrated is projecting downwardly, being in the position it would occupy when the lower curved end thereof is submerged in the soil. A consideration of the foregoing detail in association with the band-arrow 16 will clearly indicate that as the spokes successively rotate and enter the ground with the longitudinal edges 11 in advance, an efficient scouring action will take place along the surfaces 17 and 18 which converge towards the edges 11, whereby the soil will be parted with a minimum of resistance thereby.

From a consideration of the foregoing in association with the accompanying drawing, it will become apparent that I have succeeded in defining a cultivator wheel structure which will materially reduce the draft in comparison for instance with the conventional solid disc cultivator, which will sever and cut off weed-growth in its advance with much less agitation of the soil than is the case with the conventional disc cultivator, and which will, in addition, be self-scouring or self-cleaning by permitting the soil to escape between the spokes.

Since various modifications can be made in my invention as hereinabove described and many apparently widely different embodiments of same made within the scope of the claims without departing from such spirit and scope, it is intended that all matter contained in the accompanying specification shall be interpreted as illustrative only and not in a limiting sense and I desire only such limitations placed thereon as are specifically expressed in the accompanying claims.

What I claim as my invention is:

1. A cultivator wheel for attachment to a shaft positioned diagonally to the direction of travel, said wheel consisting of a hub, spokes radiating therefrom normal to the rotary axis of said wheel for a substantial portion of their total length and then curving, a rim connected to the outer ends of said spokes, the wheel as-a-whole thus having the characteristic of concavity, said rim having an edge-sharpened outer perimeter.

2. A concave-o-convex cultivator wheel for attachment to a shaft positioned diagonally to the direction of travel, the concave side thereof being the leading side, said wheel consisting of a hub, spokes radiating therefrom, said spokes, when viewed in transverse cross-section, having a boundary which is rounded for a portion of its length but converges to a point substantially opposite the rounded portion to provide a longitudinal soil entering edge on the convex side of said wheel, said rounded portion being on the concave side, said spokes being curved medially upon the length thereof and a rim connected to the outer ends of said spokes, said rim having an edge-sharpened outer perimeter.

3. A concave-o-convex cultivator wheel for attachment to a shaft positioned diagonally to the direction of travel, the concave side thereof being the leading side, said wheel consisting of a hub, spokes radiating therefrom normal to the rotary axis of said wheel for a substantial portion of their total length, and then curving, a rim connected to the outer ends of said spokes, said spokes when viewed in transverse cross-section having a boundary which is rounded for a portion of its length but converges to a point substantially opposite the rounded portion to provide a longitudinal soil entering edge on the convex side of said wheel, said rounded portion being on the concave side, said rim having an edge-sharpened outer perimeter.

ANDREW B. ALLEN.